United States Patent [19]

Sugio et al.

[11] 4,383,066
[45] May 10, 1983

[54] POLYPHENYLENE ETHER RESIN COMPOSITION

[75] Inventors: Akitoshi Sugio, Ohmiya; Masanobu Masu, Tokyo; Masao Okabe, Abiko; Kozo Ishiyama, Tokyo, all of Japan

[73] Assignee: Mitsubishi Gas Chemical Company, Inc., Japan

[21] Appl. No.: 251,942

[22] Filed: Apr. 7, 1981

[30] Foreign Application Priority Data

Apr. 15, 1980 [JP] Japan .................................. 55-49392
Jul. 14, 1980 [JP] Japan .................................. 55-95815
Oct. 22, 1980 [JP] Japan ................................ 55-147763

[51] Int. Cl.$^3$ .............................................. C08K 5/53
[52] U.S. Cl. ...................................... 524/124; 524/128; 524/130; 524/132; 524/147; 524/323
[58] Field of Search ............... 260/45.7 PT, 45.9 NP, 260/932; 524/124, 128, 130, 132

[56] References Cited

U.S. PATENT DOCUMENTS

| | | | |
|---|---|---|---|
| 3,395,113 | 7/1968 | Irani et al. | 524/124 |
| 3,402,142 | 9/1968 | Follett | 524/130 |
| 3,539,531 | 11/1970 | Drake et al. | 260/45.7 PT |
| 3,637,588 | 1/1972 | Dix et al. | 260/45.7 PT |
| 3,894,986 | 7/1975 | Racky et al. | 260/45.7 PT |
| 3,962,377 | 6/1976 | Spivack | 260/45.95 D |
| 4,022,852 | 5/1977 | Vollmer | 260/45.9 NP |
| 4,076,690 | 2/1978 | Rosenberger | 524/130 |
| 4,191,685 | 3/1980 | Haaf et al. | 524/132 |
| 4,251,425 | 2/1981 | Ohara et al. | 260/45.7 PT |
| 4,255,324 | 3/1981 | Granzow et al. | 260/45.7 PT |

FOREIGN PATENT DOCUMENTS 1230121 4/1971 United Kingdom .

OTHER PUBLICATIONS

Moedritzer et al., Journal of Organic Chemistry, vol. 31, pp. 1603-1607 (1966).

Primary Examiner—John Kight, III
Assistant Examiner—R. A. White
Attorney, Agent, or Firm—Wenderoth, Lind & Ponack

[57] ABSTRACT

A polyphenylene ether resin composition having improved heat stability, said composition comprising a polyphenylene ether resin matrix, and dispersed therein, a phosphonic acid or its derivative of the formula

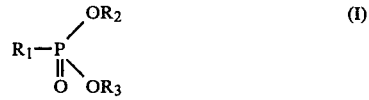

wherein $R_1$ represents an unsubstituted or substituted phenyl or naphthyl group, or a linear or branched alkyl group with 1 to 18 carbon atoms, or a group of the following formula (a)

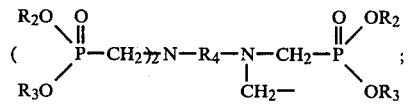

$R_2$ and $R_3$ are identical or different and each represents hydrogen atom, a metal, an unsubstituted or substituted phenyl group, or an alkyl group with 1 to 10 carbon atoms; and $R_4$ is a divalent hydrocarbon group with 2 to 10 carbon atoms.

16 Claims, No Drawings

POLYPHENYLENE ETHER RESIN COMPOSITION

This invention relates to a polyphenylene ether resin composition having improved heat stability.

Polyphenylene ethers are known resins which are disclosed, for example, in U.S. Pat. Nos. 3,306,874, 3,306,875, 3,257,357, 3,257,358 and 4,011,200 and Japanese Laid-Open Patent Publication No. 126800/1975. Since polyphenylene ethers having a molecular weight above a certain limit have a high softening point, they are useful in applications which require heat stability. In formulating a polyphenylene ether into resin compositions, however, its high softening point makes it necessary to use higher kneading and extruding temperatures than in the case of other versatile resins, and high temperatures are also required in molding the resin compositions. Moreover, molded articles of the polyphenylene ether resin compositions are frequently used at relatively high temperatures over long periods of time in contrast to those from versatile resins.

Because polyphenylene ethers are relatively unstable to heat as is well known, they undergo degradation during extrusion and molding at high temperatures, and result in polyphenylene ether resin compositions and molded articles having degraded properties and/or discoloration. These deleterious effects limit widespread utilization of polyphenylene ether resin compositions, and it has been desired to remedy these defects, particularly to improve their heat stability at high temperature.

Various methods have already been proposed for the stabilization of resin compositions containing polyphenylene ethers. These methods are classified into a group involving capping the hydroxyl groups present at the terminals of the polyphenylene ether molecule by acylation, etc., and a group comprising adding various stabilizers to polyphenylene ethers.

Known stabilizers used in the latter group include, for example, benzoates (U.S. Pat. No. 3,379,875), hexaalkylphosphoric triamides or combinations thereof with other compounds (U.S. Pat. Nos. 3,414,536, 3,420,792, 3,429,850, 3,465,062, 3,472,814, 3,483,271, 3,792,121 and 3,816,562), octa-alkylpyrophosphoramides or combinations thereof with other compounds (U.S. Pat. No. 3,450,670), amines (U.S. Pat. Nos. 3,563,934 and 3,956,423), phosphites or hydrazines (U.S. Pat. No. 3,639,334). alkanolamines (U.S. Pat. No. 3,761,541), arylphosphonic amides (U.S. Pat. No. 3,792,120), sterically hindered phenols having a triazine or isocyanuric ring (U.S. Pat. No. 4,154,719), substituted dicarboxylic acid dihydrazides (U.S. Pat. No. 3,954,904), high-molecular-weight phosphites or combinations thereof with other compounds (U.S. Pat. No. 3,952,072), amides (Japanese Pat. Publication No. 29748/1969), metal dithiocarbamates (Japanese patent publication Nos. 19395/1970 and 8352/1970), carboxylic acid anhydrides (Japanese patent publication No. 29,750/1969), phosphites (Japanese patent publication No. 29,751/1969), sterically hindered phenols or combinations thereof with other compound (Japanese patent publications Nos. 43473/1971, 42029/1971, 42030/1971, 42031/1971, 42032/1971, and 42033/1971), sterically hindered phenols having one amide linkage in the molecule (Japanese patent publication No. 24782/1971), sterically hindered phenols having one ester linkage in the molecule (Japanese patent publication No. 38623/1973), high-molecular-weight phosphites (Japanese Laid-Open patent publications Nos. 23846/1974, 31755/1974 and 40476/1975), and combinations of phosphorous acid amides and boron compounds (Japanese Laid-Open patent publication No. 129750/1974).

None of these numerous stabilizers previously proposed have been conductive to the provision of polyphenylene ether resin compositions having fully satisfactory heat stability, particularly at high temperatures, in practical applications.

It is an object of this invention therefore to improve the heat stability of a polyphenylene ether resin composition.

Another object of this invention is to provide a polyphenylene ether resin composition having excellent heat stability at high temperatures.

Still another object of this invention is to provide a polyphenylene ether resin composition showing inhibited degradation against a long heat history at high temperatures, which can withstand high temperatures during kneading, extrusion and molding and give molded articles having excellent heat stability in long-term use at high temperatures.

Other objects and advantages of this invention will become apparent from the following description.

In accordance with this invention, the objects and advantages of this invention are achieved by a polyphenylene ether resin composition having improved heat stability, said composition comprising a polyphenylene ether resin matrix and dispersed therein, a phosphonic acid or its derivative represented by the following formula (I)

wherein
$R_1$ represents an unsubstituted or substituted phenyl or naphthyl group, or a linear or branched alkyl group with 1 to 18 carbon atoms, or a group of the following formula (a)

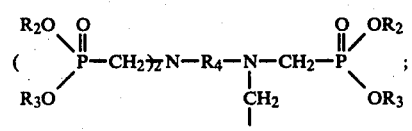

$R_2$ and $R_3$ are identical or different and each represents hydrogen atom, a metal, an unsubstituted or substituted phenyl group, or an alkyl group with 1 to 10 carbon atoms; and $R_4$ is a divalent hydrocarbon group with 2 to 10 carbon atoms.

According to this invention, there is preferably provided a polyphenylene ether resin composition having improved heat stability, comprising a polyphenylene ether resin matrix and dispersed therein, both the aforesaid phosphonic acid or its derivative and a sterically hindered phenol.

According to an especially preferred aspect of this invention, there is provided a polyphenylene ether resin composition having improved heat stability, comprising a polyphenylene ether resin matrix and dispersed therein, an organic monophosphite or an organic polyphosphite as well as the aforesaid phosphonic acid or its derivative and the aforesaid sterically hindered phenol.

The polyphenylene ether resin forming the resin matrix in the composition of this invention can be a polyphenylene ether homopolymer or copolymer obtained by polycondensing at least one mononuclear phenol of the formula

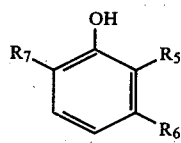

wherein
$R_5$, $R_6$ and $R_7$, independently from each other, represent a hydrogen atom or an alkyl group having 1 to 3 carbon atoms, provided that at least one of $R_5$ and $R_7$ is an alkyl group having 1 to 3 carbon atoms, or a grafted polyphenylene ether obtained by graft-polymerizing such a polyphenylene ether with a vinyl aromatic compound.

Methods for producing these polyphenylene ethers are well known per se.

Examples of the mononuclear phenols of general formula (II) include 2,6-dimethylphenol, 2,6-diethylphenol, 2,6-dipropylphenol, 2-methyl-6-ethylphenol, 2-methyl-6-propylphenol, 2-ethyl-6-propylphenol, m-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol, and 2,6-dimethyl-3-propylphenol.

Polyphenylene ethers derived from these mononuclear phenols, therefore, include homopolymers such as poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, and poly(2-ethyl-6-propyl-1,4-phenylene)ether; and copolymers such as a 2,6-dimethylphenol/2,3,6-trimethylphenol copolymer (which denotes a polyphenylene ether copolymer derived from 2,6-dimethylphenol and 2,3,6-trimethylphenol, and in the following description, polyphenylene ether copolymers are represented in the same manner), a 2,6-dimethylphenol/2,3,6-triethylphenol copolymer, a 2,6-diethylphenol/2,3,6-trimethylphenol copolymer and a 2,6-dipropylphenol/2,3,6-trimethylphenol copolymer.

The grafted polyphenylene ethers used equally to these homopolymers and copolymers in this invention are obtained by grafting vinyl aromatic compounds such as styrene, alpha-methylstyrene, vinyltoluene and vinylxylene to these homopolymers or copolymers, and include, for example, styrene-grafted poly(2,6-dimethyl-1,4-phenylene)-ether, and a styrene-grafted 2,6-dimethylphenol/2,3,6-trimethylphenol copolymer.

Preferably, such grafted polymers have a grafting ratio of about 10 to about 50%, especially about 20% to about 40%.

Among these polyphenylene ethers, poly(2,6-dimethyl-1,4-phenylene)ether, a 2,6-dimethylphenol/2,3,6-trimethylphenol copolymer, and grafted polyphenylene ethers obtained by grafting styrene to such polymers are especially preferred for use in this invention.

The resin matrix in the composition of this invention may be composed of such a polyphenylene ether alone, or a mixture of it with another polymer. The other polymer may be a thermoplastic resin or an elastomer.

The thermoplastic resin as referred to herein is a resin containing at least 25% by weight of a recurring structural unit of the following general formula (III)

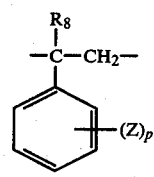

wherein
$R_8$ represents a hydrogen atom or a lower alkyl group, Z represents a halogen atom or a lower alkyl group, and p is 0 or a positive integer of 1 to 3, in the polymer chain.

The lower alkyl group for $R_8$ and Z is, for example, methyl or ethyl, and examples of the halogen atom for Z are chlorine and bromine.

Examples of such a thermoplastic resin are polystyrene, a rubber-modified polystyrene (a high-impact polystyrene), a styrene/butadiene copolymer, a styrene/butadiene/acrylonitrile copolymer, a styrene/acrylic rubber/acrylonitrile copolymer, a styrene/alphamethyl-styrene copolymer, and a styrene/butadiene block copolymer.

At least one such thermoplastic resin can be used in combination with the polyphenylene ether.

The thermoplastic resin may be included in the resin matrix in an amount of preferably not more than 95%, especially preferably not more than 80%.

The elastomer which may be used in this invention is an elastomer in the ordinary sense. Accordingly, the elastomer in this invention, for example, includes polymers having a Young's modulus at ordinary temperature of $10^5$ to $10^9$ dynes/cm$^2$ (0.1 to 1020 kg/cm$^2$), the Young's modulus being defined at pages 71 to 78 of A. V. Tobolsky, "Properties and Structures of Polymers" (John Wiley & Sons, Inc., 1960).

Examples of such an elastomer include polybutadiene, polyisoprene, a nitrile rubber, an ethylene/propylene copolymer, an ethylene/propylene/diene copolymer (EPDM), polypentenamer, Thiokol rubbers, polysulfide rubbers, an acrylic rubber, a polyurethane rubber, a grafted product formed between a butyl rubber and polyethylene, polyester elastomers, and block copolymers, such as A-B-A' type block copolymers and A-B'-A' type block copolymers of diene compounds and vinyl aromatic compounds.

In the above A-B-A' type block copolymers and A-B'-A' type block copolymers, the terminal blocks A and A' are polymer chain blocks of the vinyl aromatic compounds. The central block B in the A-B-A' type block copolymers is a polymer chain block of a conjugated diene, and the central block B' in the A-B'-A' type block copolymers is a block resulting from the hydrogenation of a polymer chain block of a conjugated diene.

In the above description, the diene, diene compound and conjugated diene are used in the same sense, and may, for example, specifically represent 1,3-butadiene, 2,3-dimethylbutadiene, isoprene, 1,3-pentadiene or a mixture of these. The vinyl aromatic compound may, for example, denote styrene, alpha-methylstyrene, vinyltoluene, vinylxylene, ethylvinylxylene, vinylnaphthalene, or mixtures thereof.

Preferably, the aforesaid A-B-A' type block copolymers or A-B'-A' type block copolymers are used as the elastomer in this invention. The terminal blocks A and A' of these block copolymers preferably have a number average molecular weight of about 2,000 to about 100,000, and the central blocks B and B' preferably have a number average molecular weight of about 25,000 to about 1,000,000.

The elastomer may be included in the resin composition of this invention in an amount of preferably not more than 20% by weight, especially preferably not more than 10% by weight, based on the resin matrix.

In the polyphenylene ether resin composition of this invention, the polyphenylene ether may be included in an amount of at least 5% by weight, preferably at least 15% by weight, based on the resin matrix.

In the polyphenylene ether resin composition of this invention, the polyphenylene ether resin matrix composed of the polyphenylene ether alone or a mixture of it with the other polymer contains, dispersed therein, a phosphonic acid or its derivative represented by the following formula (I)

wherein
$R_1$ represents an unsubstituted or substituted phenyl or naphthyl group, or a linear or branched alkyl group with 1 to 18 carbon atoms, or a group of the following formula (a)

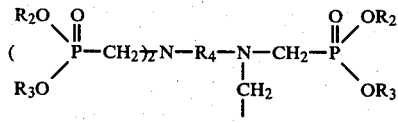

$R_2$ and $R_3$ are identical or different and each represents hydrogen atom a metal, an unsubstituted or substituted phenyl group,
or an alkyl group with 1 to 10 carbon atoms; and $R_4$ is a divalent hydrocarbon group with 2 to 10 carbon atoms.
which serves to improve the heat stability of the polyphenylene ether.

In formula (I), the substituted phenyl for $R_1$, $R_2$ and $R_3$ or the naphthyl group for $R_1$ is preferably a phenyl or naphthyl group which is substituted with 1 to 3 of alkyl groups such as a methyl or ethyl group. Examples of the unsubstituted or substituted phenyl or naphthyl groups are preferably phenyl, 4-methylphenyl, 2-dimethylphenyl, 4-ethylphenyl, 2,4-dimethylphenyl, 3,5-dimethylphenyl, 2,5-dimethylphenyl, 2,4,5-trimethylphenyl, naphthyl, α-methylnaphthyl, β-methylnaphthyl, α-ethylnaphthyl and β-ethylnaphthyl.

The metal for $R_1$ is preferably an alkali metal such as sodium or alkaline earth metal such as barium.

Examples of the alkyl group with 1 to 18 carbon atoms for $R_1$, including examples of the alkyl group with 1 to 10 carbon atoms for $R_2$ and $R_3$, which may be linear or branched, are preferably methyl, ethyl, propyl, butyl, pentyl, hexyl, octyl, nonyl, decyl, dodecyl, tetradecyl, hexadecyl and octadecyl.

The divalent hydrocarbon group with 2 to 10 carbon atoms for $R_4$ is preferably an alkylene group with 2 to 10 carbon atoms such as ethylene, 1,2-propylene, 1,3-propylene, tetramethylene, pentamethylene, hexamethylene, heptamethylene, octamethylene, nonamethylene and decamethylene.

The phosphonic acids corresponding to general formula (I) in which $R_2$ and $R_3$ are hydrogen include, for example, phenyl phosphonic acid, 4-methylphenyl phosphonic acid, 2-methylphenyl phosphonic acid, 4-ethylphenyl phosphonic acid, 2,4-dimethylphenyl phosphonic acid, 2,5-dimethylphenyl phosphonic acid, 2,4,5-trimethylphenyl phosphonic acid, 2,4,6-trimethylphenyl phosphonic acid; naphthyl-1-phosphonic acid, 8-methylnaphthyl-1-phosphonic acid, 8-methylnaphthyl-2-phosphonic acid, 8-ethylnaphthyl-1-phosphonic acid; methyl phosphonic acid, ethyl phosphonic acid, propyl phosphonic acid, iso-propyl phosphonic acid, butyl phosphonic acid, iso-butyl phosphonic acid, amyl phosphonic acid, iso-amyl phosphonic acid, n-hexyl phosphonic acid, n-heptyl phosphonic acid, n-octyl phosphonic acid, n-nonyl phosphonic acid, n-decyl phosphonic acid, n-dodecyl phosphonic acid, n-tetradecyl phosphonic acid, n-hexadecyl phosphonic acid, n-octadecyl phosphonic acid; ethylenediamine tetra(methylene phosphonic acid), 1,2-propylenediamine tetra (methylene phosphonic acid), 1,3-propylenediamine tetra(methylene phosphonic acid), tetramethylenediamine tetra(methylene phosphonic acid), pentamethylenediamine tetra(methylene phosphonic acid), hexamethylenediamine tetra(methylene phosphonic acid), heptamethylenediamine tetra(methylene phosphonic acid), octamethylenediamine tetra(methylene phosphonic acid), nonamethylenediamine tetra(methylene phosphonic acid), decamethylenediamine tetra(methylene phosphonic acid).

Phosphonic acid derivatives (esters) corresponding to general formula (I) in which $R_2$ and/or $R_3$ are the unsubstituted or substituted phenyl group or the alkyl group can be produced by reacting the aforesaid phosphonic acids with corresponding alcohols or phenols. Examples of these esters include dimethyl ester, monoethyl ester, diethyl ester, dibutyl ester, di-n-amyl ester, nonophenyl ester, diphenyl ester or di-p-butylphenyl ester of phenylphosphonic acid; diethyl ester, diphenyl ester or di-p-tolyl ester of 4-methyl-phenyl phosphonic acid; dimethylester, diethyl ester, dipropyl ester, di-iso-propyl ester, diphenyl ester, di-m-tolyl ester or di-p-tolyl ester of methylphosphonic acid; diethyl ester or dibutyl ester of ethyl phosphonic acid; diethyl ester or dipropyl ester of propyl phosphonic acid; dimethyl ester or dibutyl ester of butyl phosphonic acid; di-iso-butyl ester of iso-butyl phosphonic acid; diethyl ester or dibutyl ester of amylphosphonic acid; diethyl ester or diphenyl ester of iso-amyl phosphonic acid; diethyl ester or dibutyl ester of n-hexyl phosphonic acid; diethyl ester or dibutyl ester of n-heptyl phosphonic acid; diethyl ester or dibutyl ester of n-octyl phosphonic acid; diethyl ester or dibutyl ester of n-nonyl phosphonic acid; diethyl ester or dibutyl ester of n-decyl phosphonic acid; diethyl ester or dibutyl ester or n-dodecyl phosphonic acid; diethyl ether or dibutyl ester of n-tetradecyl phosphonic acid; dibutyl ester of n-hexadecyl phosphonic acid; dibutyl ester of n-octadecyl phosphonic acid; octamethyl ester of ethylenediamine tetra(methylene phosphonic acid); octamethyl ester of 1,3- propylenediamine tetra(methylene phosphonic acid); octaethylester of ethylenediamine tetra(methylene phosphonic acid); octamethyl ester of hexamethylenediamine tetra(methylene phosphonic acid).

Examples of phosphonic acid derivatives (salts) corresponding to general formula (I) in which $R_2$ and/or $R_3$ are a metal such as an alkali metal or an alkaline earth metal are self-evident and are preferably sodium or barium salts of aforesaid phosphonic acids or half-esters of phosphonic acids.

The phosphonic acid or its derivative represented by general formula (I) may be included in an amount of about 0.01 to about 10 parts by weight, preferably about 0.05 to about 5 parts by weight, especially preferably about 0.1 to about 3 parts by weight, per 100 parts by weight of the resin matrix.

Even when these compounds are used in amounts exceeding the above upper limits, the heat stability of the resulting resin composition is not correspondingly improved. Rather, it is frequently deleterious on the properties of the resin composition, resulting in lowered heat distortion temperatures, for example. If the amount of the stabilizer compound is below the specified limit, the heat stability of the resin composition is not improved to the expected extent.

The resin composition of this invention shows better heat stability by dispersing both the above phosphonic acid or its derivative and at least one sterically hindered phenol in the matrix resin. It is believed that the better heat stability is due to the synergistic action of the two kinds of stabilizer compounds.

Examples of sterically hindered phenols which can be effectively used in this invention include monohydric phenols such as 2,6-di-tert.-butyl-p-cresol, 2-tert.-butyl-4-methoxyphenol, 2,4-dinonylphenol, octadecyl-3-(3,5-di-tert.-butyl-4-hydroxyphenyl)propionate, diethyl 3,5-di-tert.-butyl-4-hydroxybenzylphosphonate, and 2-(3',5'-di-tert.-butyl-4'-hydroxyanilino)-4,6-dioctylthio-1,3,5-triazine; dihydric phenols such as 2,2'-methylenebis(4-methyl-6-tert.-butylphenol), 2,2'-methylenebis(4-ethyl-6-tert.-butylphenol), butylidenebis(methyl-butylphenol), 4,4'-thiobis(6-tert.-butyl-3-methylphenol), 1,1-bis(4-hydroxyphenyl)cyclohexane, 1,6-hexanediol-bis-3-(3,5-di-tert.-butyl-4-hydroxyphenyl)propionate, 2,2'-thiodiethyl-bis[3,5-ditert.-butyl-4-hydroxyphenyl)propionate] and N,N'-hexamethylenebis(3,5-di-tert.-butyl-4-hydroxyhydrocinnamide); trihydric phenols such as 1,3,5-tris(4-tert.-butyl-3-hydroxy-2,6-dimethylbenzyl)isocyanuric acid, 2,4,6-tris-(3',5'-di-tert.-butyl-4'-hydroxybenzyl)-1,3,5-triazine, a triester of 3,5-di-tert.-butyl-4-hydroxyhydrocinnamic acid with 1,3,5-tris(2-hydroxyethyl-S-triazine-2,4,6-(1H,3H,5H)trione) and 1,1,3-tris(2'-methyl-4'-hydroxy-5'-tert.-butylphenyl) butane; and tetrahydric phenols such as pentaerythrityltetrakis[3-(3,5-di-tert.-butyl-4-hydroxyphenyl)propionate].

The sterically hindered phenol may be included in the resin composition of this invention in an amount of about 0.05 to about 10 parts by weight, preferably about 0.1 to about 5 parts by weight, especially preferably about 0.5 to about 3 parts by weight, per 100 parts by weight of the matrix resin.

The resin composition of this invention shows much better heat stability by dispersing an organic monophosphite or organic polyphosphite as well as the phosphonous acid or its ester and the sterically hindered phenol in the resin matrix.

Examples of effective organic phosphotes ofr use in this invention include organic monophosphites such as triphenyl phosphite, tricresyl phosphite, triisooctyl phosphite, tridecyl phosphite, tri-2-ethylhexyl phosphite, trioctadecyl phosphite, tri(octylphenyl)phosphite, tri(nonylphenyl)phosphite, tridodecylthio phosphite, phenyldiethyl phosphite, phenyl-di(2-ethylhexyl)phosphite, isooctyldiphenyl phosphite, diisooctylmonophenyl phosphite and di(2-ethyloxyl)mono(isooctylphenyl)phosphite; and organic polyphosphites such as a phosphite resin of hydrogenated bisphenol A. Among these organic phosphites, the organic polyphosphites are preferred. An organic monophosphite may be used in combination with an organic polyphosphite.

The organic phosphite may be included into the resin composition of this invention in an amount of about 0.05 to about 10 parts by weight, preferably about 0.1 to about 5 parts by weight, especially preferably about 0.5 to about 3 parts by weight, per 100 parts by weight of the resin forming the matrix.

The resin composition of this invention may further contain various additives depending upon the intended uses. Examples of the additives include lubricants, such as olefin waxes typified by polyethylene wax and polypropylene wax; phosphate-type fire retardants typified by triphenyl phosphate or tricresyl phosphate; bromine-type fire retardants typified by decabromobiphenyl pentabromotoluene or decabromobiphenyl ether; pigments typified by titanium dioxide or zinc oxide; inorganic fillers typified by glass fibers, asbestos, wollastonite, mica or talc; and organic fillers typified by carbon fibers. The amounts of these additives vary depending upon their types, but should be within the ranges which do not degrade the heat stability of the resin composition of this invention.

The resin composition of this invention can be easily produced by melt-mixing methods known with regard to thermoplastic resins. For example, it can be prepared conveniently by a method which comprises mixing the polyphenylene ether or a mixture of it with another polymer such as a thermoplastic resin or elastomer, with predetermined amounts of the phosphonous acid or its ester, and optionally the sterically hindered phenol and optionally the organic phosphite in a mixer, then kneading the mixture fully in a melt-extruder, and pelletizing the resulting homogeneous molten mixture.

The following Examples and Comparative Examples illustrate the resin composition of this invention more specifically. Unless otherwise specified, all parts and percentages in these examples are by weight.

EXAMPLE 1 AND COMPARATIVE EXAMPLE 1

Sixty (60) parts of a 2,6-dimethylphenol/2,3,6-trimethylphenol copolymer (2,3,6-trimethylphenol 5 mole%) having an intrinsic viscosity, measured at 25° C. using chloroform as a solvent, of 0.52 dl/g, 37 parts of high-impact polystyrene (the polystyrene matrix having an intrinsic viscosity, measured at 25° C. using chloroform as a solvent, of 0.89 dl/g; gel content analyzed by using a mixture of methyl ethylketone and acetone as a solvent of 12.9% by weight), 2 parts of a polystyrene/polybutadiene/polystyrene block copolymer (the weight ratio of the polystyrene blocks to the polybutadiene block 30:70; the viscosity of a 20% toluene solution of the copolymer measured at 25° C. using a Brookfield model RVT viscometer, of 1500 cps), 1 part of an ethylene/propylene copolymer (having a reduced specific viscosity, measured at 135° C. in a concentration of 0.1 g/100 ml using decalin as a solvent, of 2.0 and a glass transition point of −49° C.), 5.8 parts of triphenyl phosphate, 7 parts of titanium dioxide and 1.0 part of phenylphosphonic acid

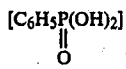

were fully mixed in a Henschel mixer. The resulting mixture was pelletized by a twin-screw extruder (AS-30, a product of Nakatani Kikai Seisakusho) in which the maximum temperature of the cylinder was set at 290° C. A test specimen, ⅛ inch thick, for measurement of Izod impact strength was molded from the resulting pellets under an injection pressure of 1050 kg/cm² using an injection molding machine (SJ-35B, a product of Meiki Seisakusho). The test specimen was aged in hot air at 115° C. for 10 days. Its Izod impact strength was measured before and after the aging. The results are tabulated below.

For comparison, the above procedure was repeated except that the phenylphosphonic acid was not used. The Izod impact strength of the test specimen not containing the phosphonic acid was measured and the results are also tabulated below (Comparative Example 1).

|  | Izod impact strength (notched, kg-cm/cm) | |
|---|---|---|
|  | Before aging | After aging |
| Example 1 | 24.5 | 17.6 (72%) |
| Comparative Example 1 | 19.6 | 11.4 (58%) |

In the above and subsequent tables, the parenthesized figures show the percent retention calculated as follows:

$$\text{Retention (\%)} = \frac{\text{Izod impact strength after aging}}{\text{Izod impact strength before aging}} \times 100$$

The above table clearly shows that the use of phenylphosphonic acid improved the Izod impact strength of the molded product after the aging.

EXAMPLE 2

The procedure of Example 1 was repeated except that 1.0 part of diethyl phenylphosphonate

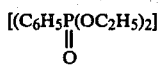

was used instead of 1.0 part of phenylphosphonic acid. The test specimen was examined for Izod impact strength in the same was as in Example 1.

The results of Example 2 are tabulated below together with the result of Comparative Example 1.

|  | Izod impact strength (notched, kg-cm/cm) | |
|---|---|---|
|  | Before aging | After aging |
| Example 2 | 24.4 | 19.2 (79%) |
| Comparative Example 1 | 19.6 | 11.4 (58%) |

EXAMPLE 3

The pellets produced in Example 2 were left to stand for 20 minutes in the molten state in the cylinder of an injection molding machine (SJ-35B) in which the maximum temperature of the cylinder was set at 280° C., and thereafter injection-molded to prepare test specimens for measurement of Izod impact strength. The results are tabulated below together with the data obtained in Example 2.

|  | Izod impact strength (notched, kg-cm/cm) | |
|---|---|---|
|  | Method of Example 1 | After 20 minute standing |
| Example 3 | 24.4 | 20.3 (83%) |

It is seen from the above table that the resin composition of this invention shows a high retention of Izod impact strength even after it has been subjected to a heat history at high temperature.

EXAMPLE 4 AND COMPARATIVE EXAMPLE 2

The procedure of Example 1 was repeated except that 0.4 part of phenyl phosphonic acid and 0.6 part of 2,2′-methylene bis(4-methyl-6-tert-butylphenol) were used instead of 1.0 part of phenylphosphonic acid. The test specimen was examined for Izod impact strength in the same way as in Example 1.

For comparison, the results of Comparative Example 2 wherein only 1 part of 2,2′-methylene bis(4-methyl-6-tert-butylphenol) was used are tabulated below together with the results of Example 4.

|  | Izod impact strength (notched, kg-cm/cm) | |
|---|---|---|
|  | Before aging | After aging |
| Example 4 | 23.9 | 17.9 (75%) |
| Comparative Example 2 | 19.3 | 10.6 (55%) |

EXAMPLE 5 AND COMPARATIVE EXAMPLE 3

The procedure in Example 3 was repeated except that 0.4 part of diethyl phenylphosphonate and 0.6 part of 2,2′-methylene bis(4-methyl-6-tert-butylphenol) were used instead of 1.0 part of diethyl phenylphosphonate. The test specimen was examined for Izod impact strength in the same way in Example 3.

For comparison, the results of Comparative Example 3 wherein only 1 part of 2,2′-methylene bis(4-methyl-6-tert-butylphenol) was used are tabulated below together with the results of Example 5.

|  | Izod impact strength (notched, kg-cm/cm) | |
|---|---|---|
|  | Method of Example 1 | After 20 minute standing |
| Example 5 | 23.7 | 20.7 (87%) |

| | Izod impact strength (notched, kg-cm/cm) | |
|---|---|---|
| | Method of Example 1 | After 20 minute standing |
| Comparative Example 3 | 19.3 | 14.6 (76%) |

EXAMPLE 6 AND COMPARATIVE EXAMPLE 4

39 Parts of poly(2,6-dimethyl-1,4-phenylene)ether having an intrinsic viscosity, measured at 25° C. in chloroform, of 0.54 dl/g, 59 parts of the same high-impact polystyrene as used in Example 1, 2 parts of the same polystyrene/polybutadiene/polystyrene block copolymer as used in Example 1, 10.5 parts of triphenyl phosphate, 7 parts of titanium dioxide, 1 part of n-octyl phosphonic acid were fully mixed in a Henschel mixer. The mixture was pelletized by a twin-screw extruder (AS-30) in which the maximum temperature of the cylinders was set at 290° C. The pellets were injection-molded under an injection pressure of 1050 kg/cm$^2$ using an injection molding machine (SJ-35B) to prepare a test specimen, ⅛ inch thick, for measurement of Izod impact strength. The resulting test specimen was aged in hot air at 85° C. for 20 days, and its Izod impact strength was measured before and after the aging. The results are tabulated below.

For comparison, the above procedure was repeated except that the n-octylphosphonic acid was not used. The results are also tabulated below (Comparative Example 4).

| | Izod impact strength (notched; kg-cm/cm) | |
|---|---|---|
| | Before aging | After aging |
| Example 6 | 11.4 | 9.7 (85%) |
| Comparative Example 4 | 10.2 | 7.6 (75%) |

EXAMPLE 7 AND COMPARATIVE EXAMPLE 5

85 Parts of the same 2,6-dimethylphenol/2,3,6-trimethylphenol copolymer as used in Example 1, 15 parts of the same high-impact polystyrene as used in Example 1, 5 parts of titanium dioxide, 0.2 parts of diphenyl 4-methylphenylphosphonate and 1.8 parts of 2,6-di-tert-butyl-p-cresol were fully mixed in a Henschel mixer. The resulting mixture was pelletized by a twin-screw extruder (AS-30) in which the maximum temperature of the cylinders was set at 300° C. The pellets were injection-molded under an injection pressure of 1320 kg/cm$^2$ by an injection molding machine (SJ-35B) in which the maximum temperature of the cylinder was set at 320° C. to prepare a test specimen, ⅛ inch thick, for measurement of Izod impact strength. The test specimen was aged in hot air at 120° C. for 100 hours. The Izod impact strengths of the specimen was measured before and after the aging, and the results are tabulated below.

For comparison, the above procedure was repeated except that the stabilizer compounds were not added. The results are also shown in the following table (Comparative Example 5).

| | Izod impact strength (notched, kg-cm/cm) | |
|---|---|---|
| | Before aging | After aging |
| Example 7 | 8.5 | 7.2 (85%) |
| Comparative Example 5 | 8.8 | 5.3 (60%) |

EXAMPLES 8 TO 10 AND COMPARATIVE EXAMPLE 6

Ten parts of the same 2,6-dimethylphenol/2,3,6-trimothylphenol copolymer used as in Example 1 was added to a solution of 0.1 part of diethyl phenylphosphonate in a suitable amount of acetone. The mixture was slurried by agitation. It was dried in the air overnight and then further dried at 40° C. under reduced pressure for 8 hours (Example 8). The above procedure was repeated except that the amount of the diethyl phenylphosphonate was changed to 0.2 part (Example 9) and 0.4 part (Example 10).

1.5 Parts of each of the powdery mixtures was molded into cylindrical specimens under pressure. The test specimens were set in a heater of a Koka-type flow tester (a product of Shimadzu Seisakusho) maintained at 280° C., and allowed to stand for 60 minutes under a pressure of 30 kg/cm$^2$. Sixty minutes later, the heater was fully cooled, and the Hunter's whitenesses of the cylindrical specimens were measured by a color difference meter (Color Studio CS-K5F, a product of Nippon Denshoku Kogyo K.K.). The results were tabulated below.

For comparison, test specimens were prepared in accordance with the procedure under the same conditions as above except that diethyl phenylphosphonate was not added. The results are shown in the following table (Comparative Example 6).

| | Hunter's whiteness |
|---|---|
| Example 8 | 20.0 |
| Example 9 | 21.2 |
| Example 10 | 21.3 |
| Comparative Example 6 | 14.9 |

The results in the above table show that the diphosphonite is effective for inhibiting coloration of the polyphenylene ether resin under heat.

EXAMPLE 11 AND COMPARATIVE EXAMPLE 7

An autoclave was charged with 100 parts of ethylbenzene and 165 parts of poly(2,6-dimethyl-1,4-phenylene)ether having an intrinsic viscosity, measured at 25° C. in chloroform, of 0.55 dl/g, and they were heated to 125° C. with stirring to form a solution. Then 7 parts of di-tert.-butyl peroxide and 65 parts of styrene were added to the solution and reacted at 165° C. for 2 hours. The reaction mixture was withdrawn, and dried at 215° C. under reduced pressure for 2 hours to remove ethylbenzene and the unreacted styrene to afford styrene-grafted poly(2,6-dimethyl-1,4-phenylene)ether. The grafted copolymer had a polystyrene content of about 25%.

The procedure in Example 8 was repeated except that 10 parts of the grafted copolymer and ethanol were used instead of 10 parts of 2,6-dimethylphenol/2,3,6- trimethylphenol copolymer and acetone. The resulting cylindrical specimens were examined for Hunter's whiteness. The results are tabulated below.

For comparison, the result from a cylindrical specimen prepared from the grafted copolymer is also tabulated below.

|  | Hunter's whiteness |
|---|---|
| Example 11 | 15.7 |
| Comparative Example 7 | 13.8 |

EXAMPLE 12 AND COMPARATIVE EXAMPLE 8

The procedure in Example 1 was repeated except that 1 part of 1,2-propylenediamine tetra(methylene phosphonic acid) was used instead of 1.0 part of phenylphosphonic acid. The test specimen was examined for Tensile impact strength.

For comparison, the results of Comparative Example 8 wherein 1,2-propylenediamine tetra(methylene phosphonic acid) was not used are also tabulated below.

|  | Tensile impact strength (kg/cm/cm$^2$) | |
|---|---|---|
|  | Before aging | After aging |
| Example 12 | 140 | 111 (79%) |
| Comparative Example 8 | 178 | 71 (40%) |

In the above and subsequent tables, the parenthesized figures show the percent retention calculated as follows:

$$\text{Retention (\%)} = \frac{\text{Tensile impact strength after aging}}{\text{tensile impact strength before aging}} \times 100$$

The above table clearly shows that the use of 1,2-propylenediamine tatra(methylene phosphonic acid) improved the tensile impact strength of the molded product after the aging.

EXAMPLE 13

The procedure in Example 12 was repeated except that 0.4 part of 1,2-propylenediamine tetra(methylene phosphonic acid) and 0.6 part of 2,2'-methylene bis(4-methyl-6-tert-butylphenol) were used instead of 1 part of 1,2-propylenediamine tetra(methylene phosphonic acid). The results of Example 13 are tabulated below.

|  | Tensile impact strength (kg · cm/cm$^2$) | |
|---|---|---|
|  | Before aging | After aging |
| Example 13 | 173 | 116 (67%) |

EXAMPLE 14 AND COMPARATIVE EXAMPLE 9

The forepart of the procedure in Example 6 was repeated except that 1 part of hexamethylenediamine tetra(methylene phosphonic acid) was used instead of 1 part of n-octyl phosphonic acid.

The resulting pellets were injection-molded under an injection pressure of 1050 kg/cm$^2$ using an injection molding machine (SJ-35B) in which the maximum temperature of the cylinders was set at 290° C. to prepare a test specimen, 1/16 inch thick, S-type, for measurement of tensile impact strength.

The resulting test specimen was aged in hot air at 85° C. for 20 days, and Tensile impact strength was measured before and after the aging. The results are tabulated below.

For comparison, the above procedure was repeated except that the hexamethylenediamine tetra(methylene phosphonic acid) was not used, the results are also tabulated below.

|  | Tensile impact strength (kg · cm/cm$^2$) | |
|---|---|---|
|  | Before aging | After aging |
| Example 14 | 150 | 105 (70%) |
| Comparative Example 9 | 145 | 70 (48%) |

EXAMPLE 15

The procedure in Example 1 was repeated except that 2 parts of 1,2-propylenediamine tetra(methylene phosphonic acid) was used. The results are tabulated below.

|  | Tensile impact strength (kg · cm/cm$^2$) | |
|---|---|---|
|  | Before aging | After aging |
| Example 15 | 144 | 118 (82%) |

EXAMPLE 16 AND COMPARATIVE EXAMPLE 9

The forepart of the procedure in Example 1 was repeated except that 1 part of di-sodium salt of phenylphosphonic acid was used instead of 1 part of phenylphosphonic acid.

A test specimen, 1/16 inch, S-type, for measurement of tensile impact strength was molded from the resulting pellets under an injection pressure of 1050 kg/cm$^2$ using an injection molding machine (SJ-35B) in which the maximum temperature of the cylinder was set at 280° C. The test specimen was aged in hot air at 115° C. for 10 days. The tensile impact strength was measured before and after the aging. The results are tabulated below.

For comparison, the above procedure was repeated except that the disodium salt of phenylphosphonic acid was not used. The results was also tabulated below.

|  | Tensile impact strength (kg · cm/cm$^2$) | |
|---|---|---|
|  | Before aging | After aging |
| Example 16 | 159 | 102 (64%) |
| Comparative Example 9 | 178 | 71 (40%) |

The above table clearly shows that the use of di-sodium salt of phenylphosphonic acid improved of the molded product after the aging.

EXAMPLE 17 AND COMPARATIVE EXAMPLE 10

The procedure in Example 16 was repeated except that 0.4 part of di-sodium salt of phenylphosphonic acid and 0.6 part of 2,2'-methylene bis(4-methyl-6-tert-butylphenol) were used instead of 1 part of di-sodium salt of phenylphosphonic acid. The results are tabulated below together with the results of Example 16.

For comparison, the procedure in Example 16 was also repeated except that 1 part of 2,2-methylene bis(4-methyl-6-tert-butylphenol) was used instead of 1 part of disodium salt of phenylphosphonic acid. The results are also tabulated below.

The table clearly shows a synergistic effect between disodium salt of phenylphosphonic acid and the hindered phenolic compound.

| Example No. | Additives | Tensile impact strength (kg-cm/cm$^2$) | |
|---|---|---|---|
| | | Before aging | After aging |
| 17 | disodium salt of phenylphosphonic acid 0.4 part and 2,2'-methylene bis(4-methyl-6-tert-butylphenol) 0.6 part | 131 | 121 (92%) |
| 16 | di-sodium salt of phenylphosphonic acid 1.0 part | 159 | 102 (64%) |
| Comparative Example 10 | 2,2'-methylene bis(4-methyl-6-tert-butylphenol) 1.0 part | 132 | 77 (58%) |

EXAMPLE 18 AND COMPARATIVE EXAMPLE 11

The procedure in Example 14 was repeated except that 1 part of barium salt of phenylphosphonic acid was used instead of 1 part of hexamethylenediamine tetra(methylene phosphonic acid).

The resulting test specimen was aged in hot air at 85° C. for 20 days, and tensile impact strength was measured before and after the aging. The results are tabulated below.

For comparison, the above procedure was repeated except that the barium salt of phenylphosphonic acid was not used. The results are also tabulated below.

| | Tensile impact strength (kg · cm/cm$^2$) | |
|---|---|---|
| | Before aging | After aging |
| Example 18 | 153 | 110 (72%) |
| Comparative Example 11 | 145 | 70 (48%) |

EXAMPLE 19

The procedure in Example 16 was repeated except that 2.0 part of di-sodium salt of phenylphosphonic acid was used. The results was tabulated below.

| | Tensile impact strength (kg · cm/cm$^2$) | |
|---|---|---|
| | Before aging | After aging |
| Example 19 | 150 | 102 (68%) |

EXAMPLE 20 AND COMPARATIVE EXAMPLE 12

The procedure in Example 16 was repeated except that 0.4 part of di-sodium salt of phenylphosphonic acid and 0.6 part of 2-(3',5'-di-tert-butyl-4'-hydroxyanilino)-4,6-di-octylthio-1,3,5-triazine ("Irganox 565" ®, product of Ciba Geigy Co.) were used instead of 1.0 part of di-sodium salt of phenylphosphonic acid. The results are tabulated below.

For comparison, the procedure in Example 16 was also repeated except that 1 part of "Irganox 565" ® was used instead of 1 part of di-sodium salt of phenylphosphonic acid. The results are also tabulated below together with the results of Example 16.

| Example No. | Additive | Tensile impact strength (kg · cm/cm$^2$) | |
|---|---|---|---|
| | | Before aging | After aging |
| 20 | di-sodium salt of phenylphosphonic acid 0.4 part and Irganox 565 ® 0.6 part | 144 | 108 (75%) |
| 16 | di-sodium salt of phenylphosphonic acid 1.0 part | 159 | 102 (64%) |
| Comparative Example 12 | Irganox 565 ® | 140 | 82 (59%) |

What we claim is:

1. A polyphenylene ether resin composition having improved heat stability, said composition consisting essentially of a polyphenylene ether resin matrix, and dispersed therein, a phosphonic acid or its derivative of the formula

wherein $R_1$ represents an unsubstituted phenyl or naphthyl group or a phenyl or naphthyl group substituted with 1 to 3 alkyl groups, or a linear or branched alkyl group with 1 to 18 carbon atoms, or a group of the following formula (a)

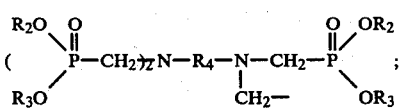

$R_2$ and $R_3$ are identical or different and each represents hydrogen atom, an alkali or alkaline earth metal, an unsubstituted phenyl group or phenyl group substituted with 1 to 3 alkyl groups, or an alkyl group with 1 to 10 carbon atoms; and $R_4$ is a divalent hydrocarbon group with 2 to 10 carbon atoms.

2. The composition of claim 1 wherein the polyphenylene ether resin constituting the matrix is a polyphenylene ether homopolymer or copolymer obtained by polycondensing at least one mononuclear phenol of the formula

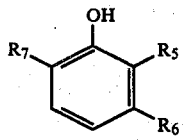

wherein
R$_5$, R$_6$ and R$_7$, independently from each other, represent a hydrogen atom or an alkyl group having 1 to 3 carbon atoms, provided that at least one of R$_5$ and R$_7$ is an alkyl group having 1 to 3 carbon atoms, or a grafted polyphenylene ether obtained by graft-copolymerizing said polyphenylene ether with a vinyl aromatic compound.

3. The composition of claim 2 wherein the vinyl aromatic compound is selected from the group consisting of styrene, alpha-methylstyrene, vinyltoluene and vinylxylene.

4. The composition of claim 1 wherein the polyphenylene ether resin constituting the matrix is poly(2,6-dimethyl-1,4-phenylene)ether, a polyphenylene ether copolymer derived from 2,6-dimethylphenol and 2,3,6-trimethylphenol, or a grafted polyphenylene ether obtained by grafting styrene to any of said polyphenylene ethers.

5. The composition of claim 1 wherein the polyphenylene ether resin matrix is a mixture of a polyphenylene ether with another polymer which is a thermoplastic resin containing at least 25% by weight of a recurring structural unit of the formula

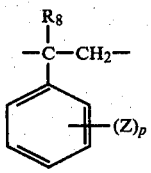

wherein
R$_8$ represents a hydrogen atom or a lower alkyl group, Z represents a halogen atom or a lower alkyl group, and p is 0 or a positive integer of 1 to 3,
in the polymer chain and
said other polymer being an elastomer having a Young's modulus at ordinary temperature of $10^5$ to $10^9$ dynes/cm$^2$.

6. The composition of claim 5 wherein the elastomer is an elastomeric block copolymer of the type A-B-A' wherein A and A' represent a polymer chain block of a vinyl aromatic compound and B represents a polymer chain block of a conjugated diene, or the type A-B'-A' wherein A and A' are as defined above, and B' represents a hydrogenated polymer chain block of a conjugated diene.

7. The composition of claim 6 wherein the vinyl aromatic compound is selected from the group consisting of styrene, alpha-methylstyrene, vinyltoluene, vinylxylene, ethylvinylxylene, vinylnaphthalene and mixtures thereof.

8. The composition of claim 6 wherein the conjugated diene is selected from the group consisting of 1,3-butadiene, 2,3-dimethylbutadiene, isoprene, 1,3-pentadiene and mixtures thereof.

9. The composition of claim 5 wherein the amount of the polyphenylene ether is at least 5% by weight of the resin matrix.

10. The composition of claim 1 wherein the alkali metal is sodium.

11. The composition of claim 1 wherein the alkaline earth metal is barium.

12. The composition of claim 1 wherein the amount of the phosphonic acid or its derivative is 0.01 to 10 parts by weight per 100 parts by weight of the polyphenylene ether resin matrix.

13. A polyphenylene ether resin composition having improved heat stability, said composition consisting essentially of a polyphenylene ether resin matrix, and dispersed therein, a phosphonic acid or its derivative of the formula

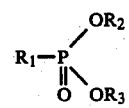

wherein
R$^1$ represents an unsubstituted phenyl or naphthyl group
or a phenyl or naphthyl group substituted with 1 to 3 alkyl groups, or a linear or branched alkyl group with 1 to 18 carbon atoms, or a group of the following formula (a)

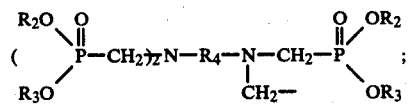

R$_2$ and R$_3$ are identical or different and each represents hydrogen atom, an alkali or alkaline earth metal, an unsubstituted phenyl group or phenyl group substituted with 1 to 3 alkyl groups, or an alkyl group with 1 to 10 carbon atoms; and R$_4$ is a divalent hydrocarbon group with 2 to 10 carbon atoms, and at least one sterically hindered phenol.

14. A polyphenylene ether resin composition having improved heat stability, said composition consisting essentially of a polyphenylene ether resin matrix, and dispersed therein, a phosphonic acid or its derivative of the formula

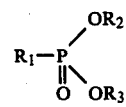

wherein
R$_1$ represents an unsubstituted phenyl or naphthyl group or a phenyl or naphthyl group substituted with 1 to 3 alkyl groups, or a linear or branched alkyl group with 1 to 18 carbon atoms, or a group of the following formula (a)

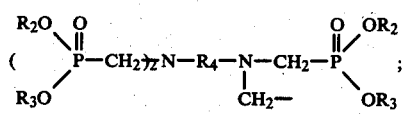

$R_2$ and $R_3$ are identical or different and each represents hydrogen atom, an alkali or alkaline earth metal, an unsubstituted phenyl group or phenyl group substituted with 1 to 3 alkyl groups, or an alkyl group with 1 to 10 carbon atoms; and $R_4$ is a divalent hydrocarbon group with 2 to 10 carbon atoms, at least one sterically hindered phenol, and at least one organic phosphite compound selected from the group consisting of organic monophosphites and organic polyphosphites.

15. The composition of claim 13 wherein the amount of the sterically hindered phenol is 0.05 to 10 parts by weight per 100 parts by weight of the polyphenylene ether resin matrix.

16. The composition of claim 14 wherein the amount of the organic monophosphite and/or organic polyphosphite is 0.05 to 10 parts by weight per 100 parts by weight of the polyphenylene ether resin matrix.

* * * * *